(12) United States Patent
Scott et al.

(10) Patent No.: US 9,106,284 B1
(45) Date of Patent: Aug. 11, 2015

(54) ANTENNA SYSTEM DRIVEN IN BEAMFORMING AND MIMO TRANSMISSION MODES

(71) Applicant: Sprint Communications Company L.P., Overland Park, KS (US)

(72) Inventors: Brent A. Scott, Leeton, MO (US); Brett L. Christian, Independence, MO (US); Saied Kazeminejad, Ashburn, VA (US); Sungki Park, Ashburn, VA (US); Young Zhao, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 48 days.

(21) Appl. No.: 14/097,379

(22) Filed: Dec. 5, 2013

(51) Int. Cl.
*H04B 7/04* (2006.01)

(52) U.S. Cl.
CPC .................................... *H04B 7/0421* (2013.01)

(58) Field of Classification Search
CPC ....................................................... H04B 7/0469
See application file for complete search history.

(56) References Cited

U.S. PATENT DOCUMENTS

| | | | |
|---|---|---|---|
| 6,870,515 B2* | 3/2005 | Kitchener et al. | 343/853 |
| 8,229,016 B2* | 7/2012 | Okamura et al. | 375/267 |
| 8,488,725 B2* | 7/2013 | Yuan et al. | 375/346 |
| 8,792,586 B2* | 7/2014 | Ko et al. | 375/299 |
| 2011/0053527 A1* | 3/2011 | Hunzinger | 455/101 |
| 2012/0329407 A1* | 12/2012 | Rousu et al. | 455/90.2 |

* cited by examiner

*Primary Examiner* — David Bilodeau

(57) ABSTRACT

Systems, equipment, and methods for driving antenna systems with pairs of overlaid orthogonal antenna elements are provided herein. In one example, a method of operating a remote radio unit that drives an antenna system is provided. The method includes receiving user communications and control data transferred by a baseband unit. If the control data indicates a beamforming mode, then the method includes generating a first plurality of radio frequency (RF) signals directed to at least one of the pairs of overlaid orthogonal antenna elements for target wireless communication devices. If the control data indicates a multiple input multiple output (MIMO) mode, then the method includes generating a second plurality of RF signals for the plurality of antenna elements, wherein the second plurality of RF signals are directed to non-adjacent ones of the pairs of the overlaid orthogonal antenna elements for the target wireless communication devices.

20 Claims, 6 Drawing Sheets

ANTENNA SYSTEM DRIVEN IN BEAMFORMING AND MIMO TRANSMISSION MODES

TECHNICAL FIELD

Aspects of the disclosure are related to the field of communications, and in particular, wireless communications and radio frequency (RF) communications using antennas and antenna systems in wireless communication networks.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

The various wireless access nodes include RF equipment and antennas to transmit and receive wireless communications, such as those mentioned above. These wireless communications can support different wireless transmission modes, such as beamforming modes and multiple-input multiple-output (MIMO) modes. However, to provide these different modes of transmission, different and separate antenna systems are typically employed. These antenna systems are typically mounted on tower structures and driven by co-located radio head units. Multiple, separate, antenna systems and radio head units for these different transmission modes can be difficult to install in high density areas, such as when attempted to be mounted on the same tower structure or antenna mast equipment.

Furthermore, the particular antenna systems employed can include many antenna elements in an arrayed configuration. However, when driving the various antenna elements in arrayed configurations, RF interference between antenna elements and insufficient spatial separation of the antenna elements can lead to poor wireless transmissions as well as limited versatility of a particular antenna for use in multiple transmission modes.

Overview

Systems, methods, and software for driving multiple transmission modes to a single antenna system that has pairs of overlaid orthogonal antenna elements are provided herein. In one example, a method of operating a remote radio unit that drives an antenna system comprising pairs of overlaid orthogonal antenna elements is provided. The method includes receiving user communications and control data transferred by a baseband unit. If the control data indicates a beamforming mode, then the method includes generating a first plurality of RF signals directed to at least one of the pairs of overlaid orthogonal antenna elements for target wireless communication devices. If the control data indicates a MIMO mode, then the method includes generating a second plurality of RF signals for the plurality of antenna elements, wherein the second plurality of RF signals are directed to non-adjacent ones of the pairs of the overlaid orthogonal antenna elements for the target wireless communication devices.

In another example, a remote radio unit that drives an antenna system comprising pairs of overlaid orthogonal antenna elements is provided. The remote radio unit includes a baseband unit interface configured to receive user communications and control data transferred by a baseband unit, and an RF system configured to generate RF signals directed to the antenna system based on at least the user communications and the control data. If the control data indicates a beamforming mode, then the RF system is configured to generate a first plurality of RF signals directed to at least one of the pairs of overlaid orthogonal antenna elements for target wireless communication devices. If the control data indicates a MIMO mode, then the RF system is configured to generate a second plurality of RF signals for the plurality of antenna elements, wherein the second plurality of RF signals are directed to non-adjacent ones of the pairs of the overlaid orthogonal antenna elements for the target wireless communication devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
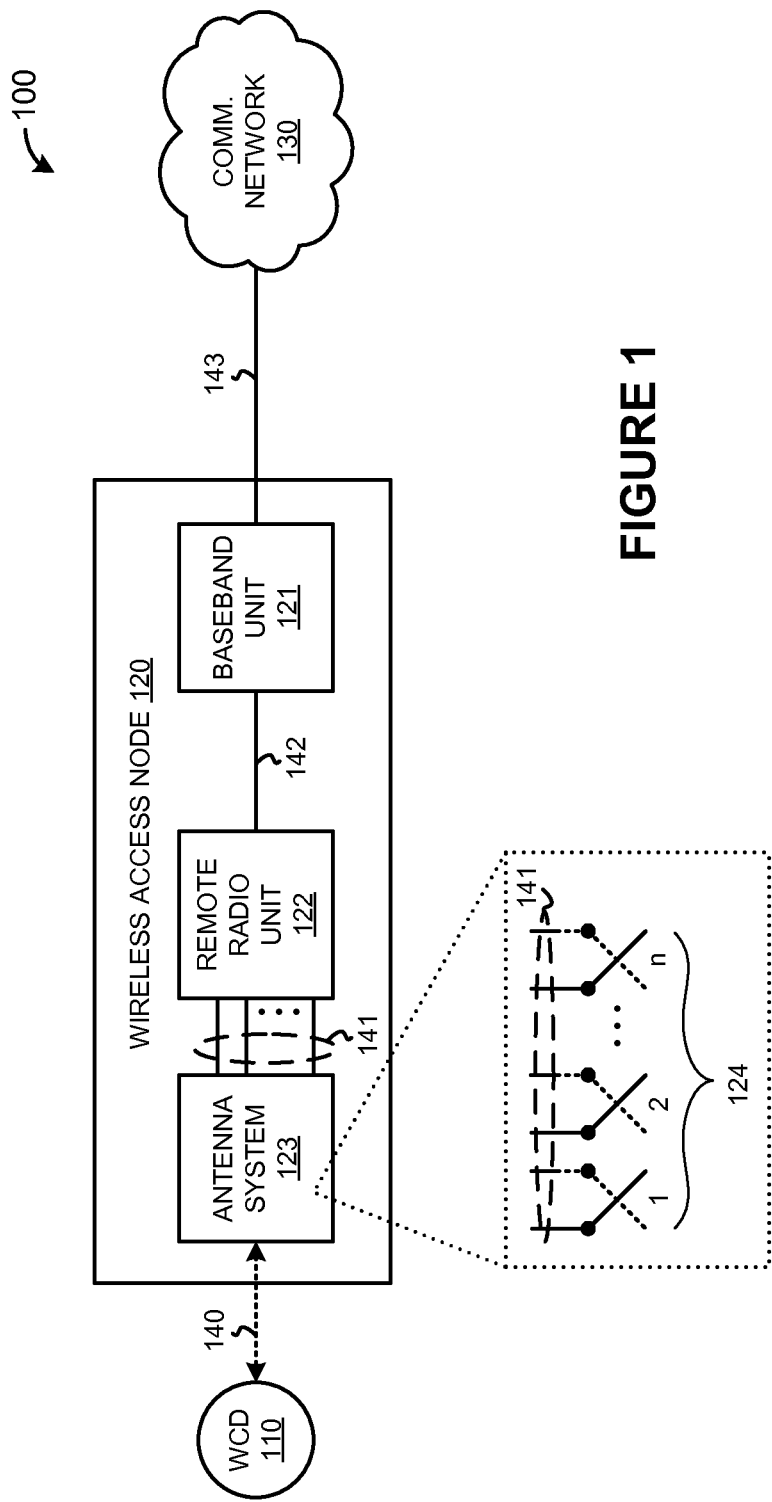
FIG. 1 is a system diagram illustrating a communication system.

As a first example of a communication system employing both beamforming and MIMO transmission modes on a single antenna system, FIG. 1 is presented. FIG. 1 is a system diagram illustrating communication system 100. Communication system 100 includes wireless communication device (WCD) 110, wireless access node 120, and communication network 130. Wireless access node 120 and communication network 130 communicate over link 143. Wireless access node 120 and WCD 110 communicate over wireless link 140. In operation, wireless access node 120 provides wireless access to communication services for wireless communication devices, such as WCD 110 over wireless link 140. These communication services can include voice calls, text messaging, and data exchange.

Wireless access node 120 includes baseband unit 121, remote radio unit 122, and antenna system 123. Baseband unit 121 interfaces with communication network 130 to exchange communications related to WCD 110 and other network communications. Baseband unit 121 exchanges these communications with remote radio unit 122 over link 142, as well as provides control data or instructions to remote radio head 122 which indicate at least a transmission mode. Remote radio unit 122 controls RF communications exchanged with antenna system 123, such as amplification, modulation, and filtering of communications.

Antenna system 123 includes one or more antenna elements 124 for directing RF energy to wireless communication devices, as well as for receiving RF energy from wireless communication devices. In this example, antenna system 123 includes 'n' pairs of overlaid orthogonal antenna elements, as indicated by "1-n" antenna element pairs 124. The one or more pairs of overlaid orthogonal antenna elements can be comprised of cross-polarized vertical, horizontal, or diagonal elements, such as those pictured in FIG. 3 below. The one or more pairs of overlaid orthogonal antenna elements are driven individually by remote radio unit 122 over associated ones of links 141.

Figure 2:
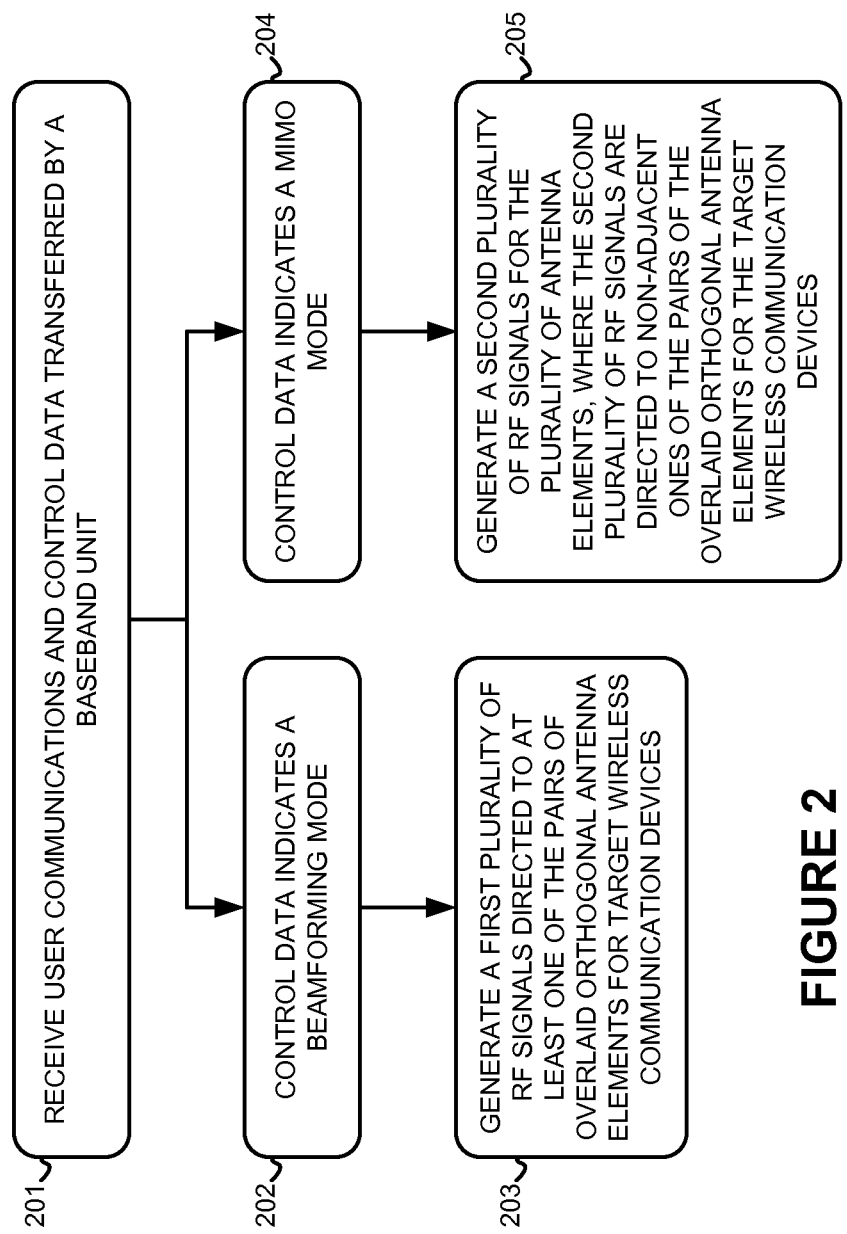
FIG. 2 is a flow diagram illustrating a method of operation of a remote radio unit.

To provide further description of the elements of FIG. 1 and the operation of wireless access node 120, FIG. 2 is presented. FIG. 2 is a flow diagram illustrating a method of operation of remote radio unit 122. The operations of FIG. 2 are referenced below parenthetically. In FIG. 2, remote radio unit 122 receives (201) user communications and control data transferred by baseband unit 121. The user communications and control data are received over link 142. The user communications can include communications for exchange with wireless communication devices, such as voice call communications, text message communications, data communications, and the like. The control data can include information related to modulation frequencies, amplification levels, filtering characteristics, as well as instructions or data indicating a transmission mode. The instructions or data indicating a transmission mode can indicate a beamforming mode and a MIMO mode, as well as which antenna elements 124 are to have RF signals directed thereto by remote radio head 122.

As mentioned above, the transmission modes can include a beamforming mode and a MIMO mode. A beamforming mode is used to direct RF energy from an antenna or antenna array, such as to directionally focus RF energy emitted from antenna system 123 to a physical location of WCD 110 or other wireless communication devices. The directionality of the RF energy can be achieved using beamforming techniques to increase RF energy for a first angular range while decreasing RF energy for a second angular range. In this example, the beamforming mode uses at least one of the pairs of overlaid orthogonal antenna elements. A MIMO mode is used to provide more robust or more efficient communications between endpoints. MIMO modes can include spatial multiplexing or transmit diversity forms. Spatial multiplexing is employed in the MIMO examples discussed herein, but these examples can alternatively employ transmit diversity. Spatial multiplexing spatially separates communications into more than one RF signal propagation pathway using different antenna elements. In this example, the MIMO mode is a spatial multiplexing mode of operation which uses one or more pair of the pairs of the overlaid orthogonal antenna elements.

If the control data indicates a beamforming mode (202), then remote radio head 122 generates (203) a first plurality of RF signals directed to at least one of the pairs of overlaid orthogonal antenna elements for target wireless communication devices. In the beamforming mode, it is desirable to have greater correlation between antenna elements of the same polarization, which in this example employs a smaller spacing between antenna elements than the MIMO mode. In some examples, a single pair of antenna elements is used in the beamforming mode, such as pair '1' of antenna elements 124, comprising two cross-polarized elements. In other examples, two antenna elements, such as similarly-polarized elements of each of pair 124-1 and 124-2, are used in the beamforming mode, and a spacing of less than 0.5 wavelengths is employed for the two antenna elements. The wavelength is for the carrier frequency at which the user communications are modulated.

If the control data indicates a MIMO mode (204), then remote radio head 122 generates (204) a second plurality of RF signals for the plurality of antenna elements, where the second plurality of RF signals are directed to non-adjacent ones of the pairs of the overlaid orthogonal antenna elements for the target wireless communication devices. In the MIMO mode, it is desirable to have lesser correlation between antenna elements, and antenna elements of different polarization, which in this example employs a larger spacing between antenna elements than the beamforming mode. In some examples, a single pair of antenna elements is used in the beamforming mode, such as pair '1' of antenna elements 124, comprising two cross-polarized elements. In some examples, two non-adjacent antenna pairs, such as pair 124-1 and 124-3, are used in the MIMO mode, and a spacing of greater than 0.65 wavelengths is employed for the two non-adjacent antenna pairs. The wavelength is for the carrier frequency at which the user communications are modulated.

Once the particular transmission mode is selected, RF signals representing modulated, amplified, and filtered versions of the user communications are directed to the associated antenna ports of remote radio unit 122. These RF signals are then transmitted over the associated antenna element 124 for wireless transmission to WCD 110 over wireless link 140.

Figure 3A:
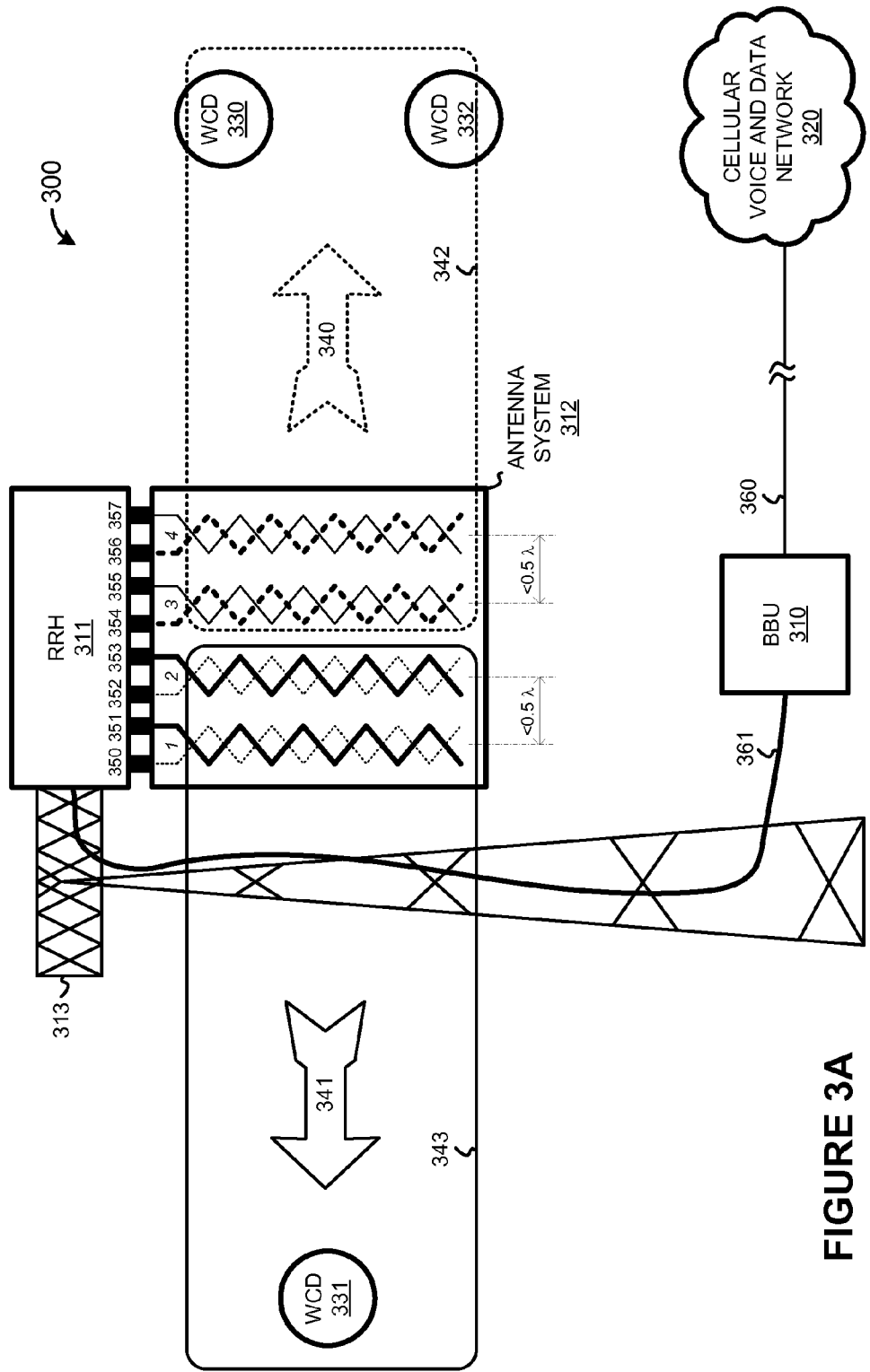
FIGS. 3A and 3B are a system diagrams illustrating a communication system.
Figure 3B:
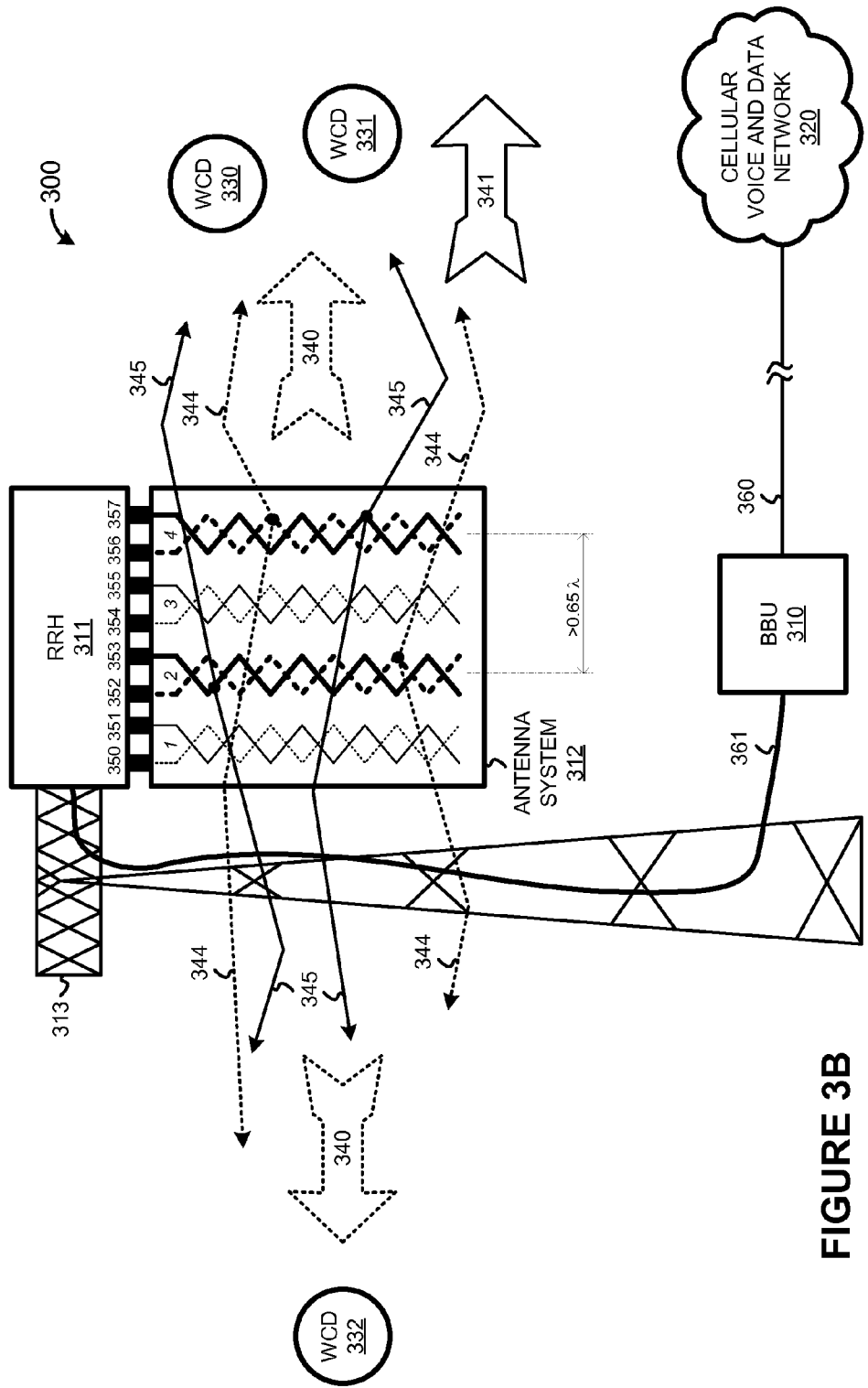

As another example of a communication system employing both beamforming and MIMO transmission modes on a single antenna system, FIGS. 3A and 3B are presented. FIG. 3A is a system diagram illustrating communication system 300 using a beamforming mode for an antenna system. FIG. 3B is a system diagram illustrating communication system 300 using a MIMO mode for an antenna system.

Communication system 300 includes baseband unit (BBU) 310, remote radio head (RRH) 311, antenna system 312, tower 313, cellular voice and data network 320, and wireless communication devices (WCD) 330-332. Cellular voice and data network 320 and BBU 310 communicate over backhaul link 360, which is one or more T1 links in this example. BBU 310 and RRH 311 communicate over optical communication link 361. RRH 311 is mounted on tower 313 along with antenna system 312. RRH 311 and antenna system 312 communicate over antenna ports 350-357. RRH 311 and antenna system 312 provide one or more wireless links 340-341 to provide wireless access to communication services for WCD 330-332. WCD 330-332 are mobile smartphone devices, and their relative positioning in FIGS. 3A and 3B are merely exemplary.

BBU 310 includes processing systems, optical and wired network transceivers, routers, computer-readable storage systems, among other equipment. BBU 310 receives user communications, overhead communications, and control instructions from external systems, such as routing, gateway, and control equipment of network 320 over link 360, and transfers some of these communications over link 361 to control the operations of RRH 311 as well as to transfer user communications for RF transmission by RRH 311. The control data can include administration and maintenance (OA&M) information. In some examples, BBU 310 determines a transmission mode, such as a beamforming or MIMO mode, and indicates this mode in control data over link 361 to RRH 311. BBU 310 can transfer the user communications and control data over optical link 361 using a Digital Radio over Fiber (D-RoF) protocol such as the Common Public Radio Interface (CPRI) high-speed serial digital interface communications, among other communication protocols and formats.

RRH 311 includes amplifiers, transceivers, filters, routers, processing systems, computer-readable storage systems, among other equipment for uplink and downlink of radio frequency (RF) signals over ones of antenna ports 350-357. As shown in FIG. 3, RRH 311 includes eight antenna ports 350-357 which are each associated with an antenna element of antenna system 312. RRH 311 receives user communications from BBU 310 over link 361, and transfers the user communications as RF signals over selected ones of antenna ports 350-357. RRH 311 could process and modify the user communications, such as formatting the user communications according to a wireless protocol, or including the communications within wireless communication protocol structures, data structures, or for apportioning among communication channels, frequencies, timeslots, resource blocks, or other configurations. RRH 311 also receives control data from BBU 310 that indicates transmission modes such as beamforming and MIMO modes. The control data can indicate which antenna ports over which to apportion the user communications, a transmit power level for each antenna port, filtering characteristics to apply to each antenna port, modulation or carrier frequency information for each antenna port, among other information. In some examples, RRH 311 only receives a subset control data from BBU 310 and determines the remaining control data based on the user communications or characteristics of RF communications received over any of antenna ports 350-357.

Antenna system 312 includes eight antenna elements, with two overlaid antenna elements grouped together into four pairs, 1-4. Each antenna element can be driven independently via an associated antenna port. Antenna system 312 receives RF energy over ones of antenna ports 350-357 and transfers the RF energy wirelessly over wireless links 340-341. The antennas of antenna system 312 are overlaid orthogonal antenna elements, where a first antenna element of each pair overlaps a second antenna element of each pair creating an overlapping 'zig-zag' configuration as shown in FIG. 3 for each pair. Each first element of a pair is cross-polarized with the second element of the pair due to the overlapping 'zig-zag' pattern. Also, each pair (1, 2, 3, 4) of antenna elements in antenna system 312 of FIG. 3 is spaced apart no more than about 0.5 wavelength ($\lambda$), where the wavelength is correlated to a carrier frequency of communications transferred by antenna system 312. For example, for a 1900 MHz carrier frequency, the wavelength is approximately 0.158 meters. One-half of 0.158 meters is 0.079 meters. Therefore, in an example antenna system for transmitting user communications at 1900 MHz, the spacing between each pair of antenna system 312 is no more than approximately 0.079 meters. Additionally, non-adjacent pairs (i.e. pairs 1 and 3, or pairs 2 and 4) of antenna system 312 are spaced greater than about 0.65 wavelength. For a 1900 MHz carrier frequency, 0.65 wavelength is approximately 0.1027 meters. Other configurations are possible depending upon the carrier frequency.

Tower 313 comprises structural elements, mounting hardware, antenna positioning equipment, cabling, and other equipment for structurally supporting at least elements 361, 311, and 312 of FIG. 3. The physical configuration of tower 313 is merely exemplary and can vary based on cost, installation requirements, and environmental factors.

Cellular voice and data network 320 is a core network of a voice and data provider. Cellular voice and data network 320 can include elements as discussed for communication network 130 in FIG. 1, although variations are possible.

Figure 4:
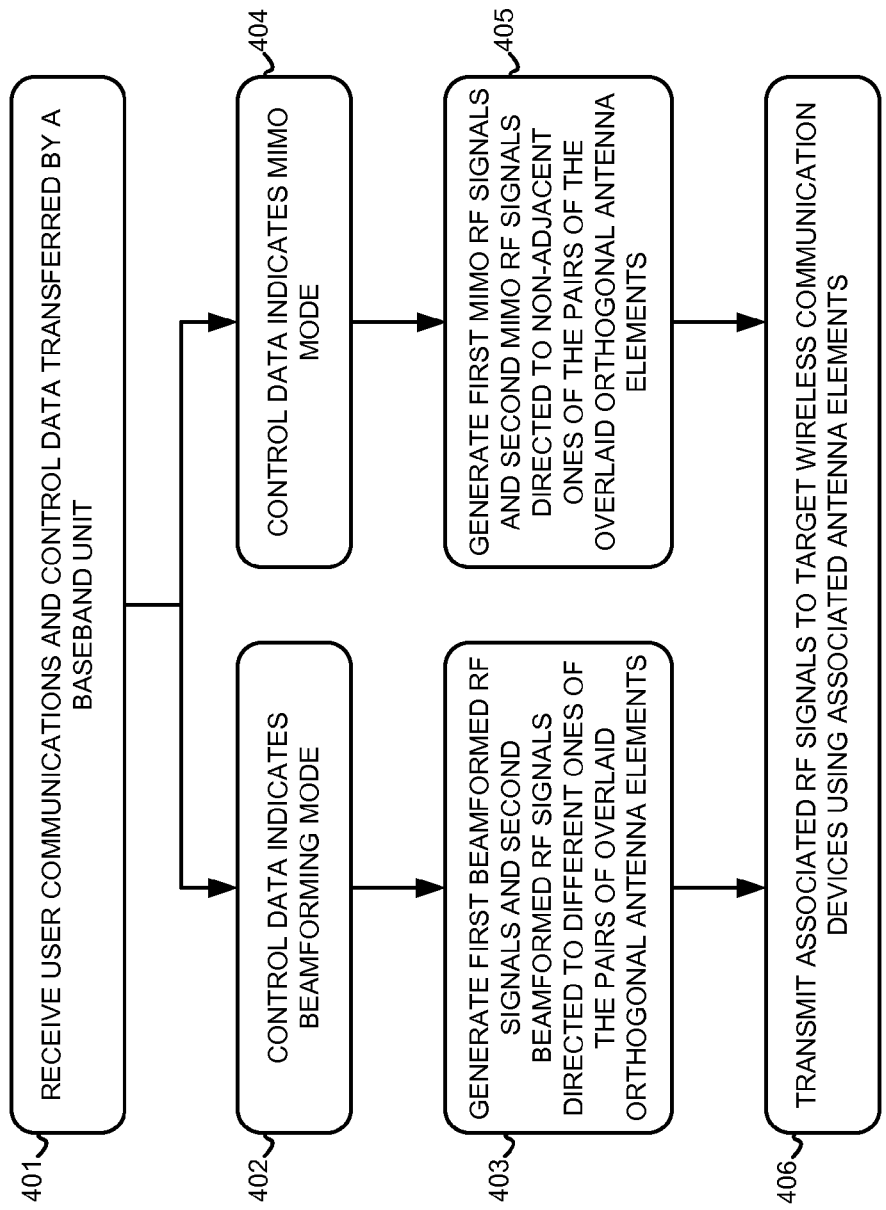
FIG. 4 is a flow diagram illustrating a method of operation of a communication system.

FIG. 4 is a flow diagram illustrating a method of operation of communication system 300. The operations of FIG. 4 are referenced below parenthetically. FIG. 3A will be discussed in FIG. 4 for at least operations 401-402-403-406, while FIG. 3B will be discussed in FIG. 4 for at least operations 401-404-405-405. Although the term 'pair' is used to indicate two overlaid orthogonal antenna elements in this example, the term 'column' can also be used which indicates a single pair of overlaid orthogonal antenna elements.

In FIG. 4, RRH 311 receives (401) user communications and control data transferred by BBU 310 over link 361. The user communications can be received in a first user communication format, such as dictated by the communication protocol used over link 361. The control data indicates an antenna configuration, such as a transmission mode, to be used by RRH 311. The transmission mode can include a beamforming mode or a MIMO mode, among other modes. In this example, three wireless communication devices are positioned in a coverage area handled by RRH 311, and can be mobile devices or stationary devices. The particular transmission mode indicated in the control instructions can be based on the positioning of each of WCD 330-332, such as to create beamformed RF transmissions to enhance downlink communications for ones of WCD 330-332. The particular transmission mode can also be based on throughput requirements, reliability requirements, or spectral efficiency requirements, such as to create MIMO transmissions to enhance downlink communications for ones of WCD 330-332. The control data can indicate which antenna ports of RRH 311 are to be used for each mode, as well as which user communications to filter, modulate, and amplify for each associated antenna port.

If the control data indicates a beamforming mode (402), RRH 311 generates (403) first beamformed RF signals and second beamformed RF signals directed to different ones of the pairs of overlaid orthogonal antenna elements. As mentioned above, the transmission modes can include a beamforming mode or a MIMO mode. A beamforming mode is used to direct RF energy from an antenna or antenna array, such as to directionally focus RF energy emitted from antenna system 312 to a physical location of ones of WCD 330-332 or other wireless communication devices. The directionality of the RF energy can be achieved using beamforming techniques to increase RF energy for a first angular range. In this example, the beamforming mode creates two RF beams, each beam using two of the pairs (columns) of overlaid orthogonal antenna elements of antenna system 312. When more than one column, but less than all four columns, of antenna system 312 are used for a particular beamformed RF signal, then the columns used to transmit the particular beamformed RF signal will typically be adjacent. For example, when two columns are used in the beamforming mode for the first beamformed RF signals, then the two columns are typically adjacent to each other. Likewise, two different columns can be used in the beamforming mode for the second beamformed RF signals, where the two columns for the second beamformed RF signals are adjacent to each other. In other examples, a different number of columns can be employed for a beamformed RF signal.

As shown in FIG. 3A, adjacent pairs 1-2 are used to form a first beam 343 directed to WCD 331 for wireless communications using wireless link 341, while adjacent pairs 3-4 are used to form a second beam 342 directed to WCD 330 and 332 for wireless communications using wireless link 340. FIG. 3A indicates that a second antenna element of pair 1 and a second antenna element of pair 2 are used to form beam 343, while a first antenna element of pair 3 and a first antenna element of pair 4 are used to form beam 342. Thus, RRH 311 directs RF signals over at least antenna ports 351 and 353 for beam 343, and antenna ports 354 and 356 for beam 342. It should be understood that different ones of the antenna elements for each associated pair could instead be used, and in some examples, both antenna elements for a particular pair can be employed. In the beamforming mode, it is desirable to have greater correlation between antenna elements of the same polarization, which in this example employs a smaller spacing between energized antenna elements than the MIMO mode. In FIG. 3A, pairs 1, 2, 3, and 4, are each separated spatially by no more than 0.5 wavelengths.

If the control data indicates a MIMO mode (404), RRH 311 generates (405) first MIMO RF signals and second MIMO RF signals directed to non-adjacent ones of the pairs of the overlaid orthogonal antenna elements. As mentioned above, the transmission modes can include a beamforming mode or a MIMO mode. A MIMO mode is used to provide more robust or more efficient communications between endpoints. MIMO modes can include spatial multiplexing or transmit diversity forms. Spatial multiplexing is employed in the MIMO examples discussed herein, but these examples can alternatively employ transmit diversity. Spatial multiplexing spatially separates communications into more than one RF signal propagation pathway using different antenna elements.

In this example, the MIMO mode is a spatial multiplexing mode of operation which uses one or more pair of the pairs of the overlaid orthogonal antenna elements. As shown in FIG. 3B, two different MIMO transmissions are employed. A first MIMO transmission 344 is used for communicating with a first subset of WCD 330-332, such as with WCD 330 and 332 over wireless link 340. A second MIMO transmission 345 is used for communicating with a second subset of WCD 330-332, such as WCD 331 over wireless link 341. MIMO transmission 344 uses a first RF transmission from a first antenna element of pair 2 and a second RF transmission from a first antenna element of pair 4. MIMO transmission 345 uses a first RF transmission from a second antenna element of pair 2, and a second RF transmission from a second antenna element of pair 4. Thus, the two transmissions for MIMO transmission 344 create two spatially separated RF transmissions that are cross-polarized from MIMO transmission 345. In FIG. 3B, pairs 2 and 4 are separated spatially by at least 0.65 wavelengths. Thus, RRH 311 directs RF signals over at least antenna ports 352, 353, 356, and 357. It should be understood that different ones of the antenna elements for each associated pair could instead be used.

Antenna system 312 transmits (406) associated RF signals to target wireless communication devices using associated antenna elements. In the beamforming mode, two separate beams directed from antenna system 312. The beams can be used to focus RF energy to particular positions to enhance communications with particular wireless communication devices. In the MIMO mode, more than one antenna element is used in spatial multiplexing to communicate with a particular wireless communication device. Beamforming is typically not employed in MIMO modes, but in the examples discussed herein, the various antenna elements can be driven to simultaneously support beamforming using one or more antenna elements while using different antenna elements for the MIMO communications.

Figure 5:
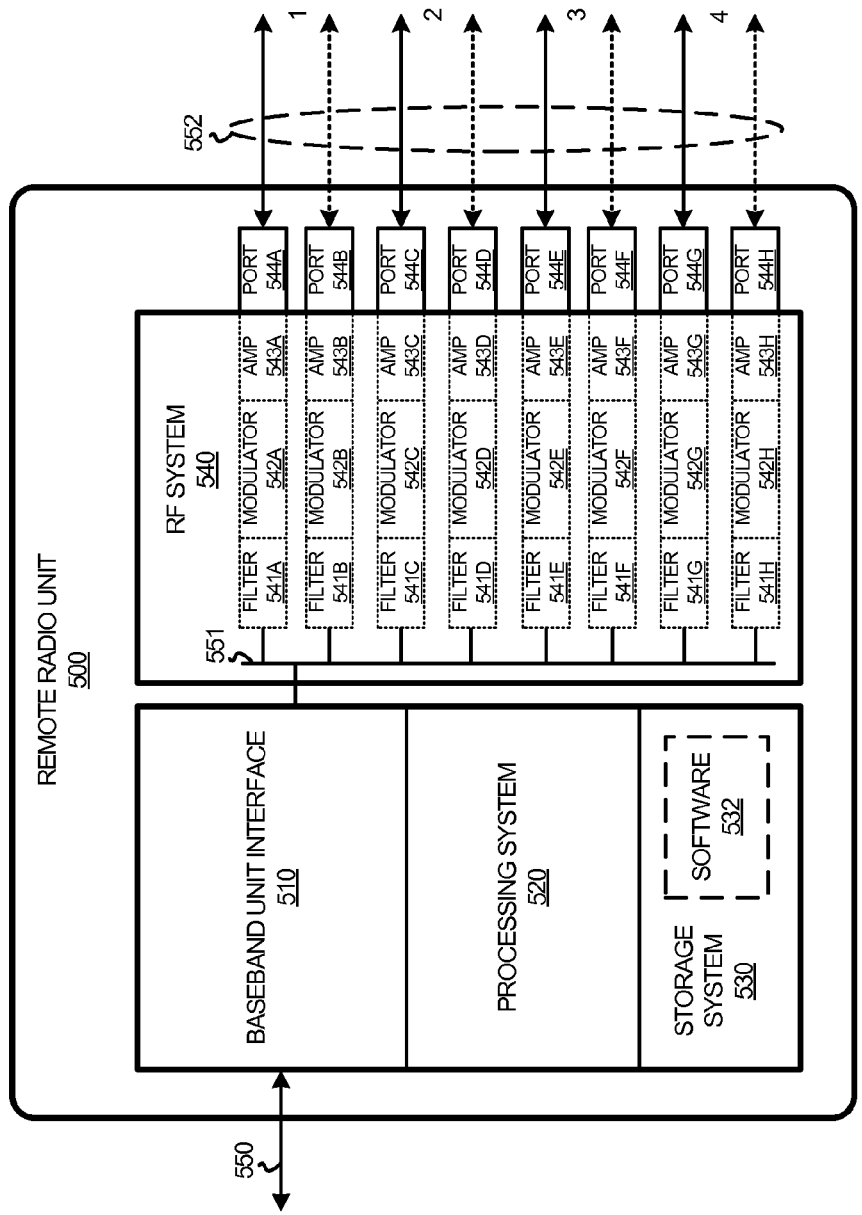
FIG. 5 is a block diagram illustrating a remote radio unit.

FIG. 5 is a block diagram illustrating remote radio unit 500, as an example of elements of remote radio unit 122 found in FIG. 1, or RRH 311 found in FIG. 3, although variations are possible. Remote radio unit 500 includes baseband unit interface 510, processing system 520, software 530, RF system 540. Baseband unit interface 510, processing system 520, software 530, RF system 540 are communicatively coupled, and baseband unit interface 510 is shown communicating over RF links 551 with RF system 540 for illustrative purposes. It should be understood that further discrete links could be employed, such as data links, power links, optical links, RF links, or other links. Remote radio unit 500 may be distributed or concentrated among multiple elements that together form the elements of FIG. 5.

Remote radio unit 500 can also include structural elements, such as a mounting structure for securing remote radio unit 500 to another support structure, such as tower, building, or other architectural element. This structure can comprise brackets, fasteners, couplers, cable guides, antenna mounts, or other structural and mounting elements. This structure could also include an enclosure for remote radio unit 500 and internal structural elements for mounting and encasing the various elements of remote radio unit 500, as well as antenna elements not shown in FIG. 5.

Baseband unit interface 510 comprises network interfaces, router equipment, and transceiver equipment for communicating with wireless communication provider equipment, such as with base systems, baseband unit equipment, or other equipment of wireless communication networks, including communicating over the Internet, or over other communication systems. Baseband unit interface 510 exchanges communications over link 550, such as exchanging user communications and receiving control instructions. Link 550 could use various protocols or communication formats as described herein for links 142-143, or 341, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media or storage device readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by remote radio unit 500 in general or processing system 520 in particular, direct remote radio unit 500 or processing system 520 to receive user communications and control data transferred by a baseband unit, if the control data indicates a beamforming mode, then generate a first plurality of radio frequency (RF) signals directed to at least one of the pairs of overlaid orthogonal antenna elements for target wireless communication devices, and if the control data indicates multiple input multiple output (MIMO) mode, then generate a second plurality of RF signals for the plurality of antenna elements, wherein the second plurality of RF signals are directed to non-adjacent ones of the pairs of the overlaid orthogonal antenna elements for the target wireless communication devices, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to receive user communications and control data transferred by a baseband unit, if the control data indicates a beamforming mode, then generate a first plurality of RF signals directed to at least one of the pairs of overlaid orthogonal antenna elements for target wireless communication devices, and if the control data indicates a MIMO mode, then generate a second plurality of RF signals for the plurality of antenna elements, wherein the second plurality of RF signals are directed to non-adjacent ones of the pairs of the overlaid orthogonal antenna elements for the target wireless communication devices.

In general, software 532 can, when loaded into processing system 520 and executed, transform processing system 520 overall from a general-purpose computing system into a special-purpose computing system customized to receive user communications and control data transferred by a baseband unit, if the control data indicates a beamforming mode, then generate a first plurality of RF signals directed to at least one of the pairs of overlaid orthogonal antenna elements for target wireless communication devices, and if the control data indicates a MIMO mode, then generate a second plurality of RF signals for the plurality of antenna elements, wherein the second plurality of RF signals are directed to non-adjacent ones of the pairs of the overlaid orthogonal antenna elements for the target wireless communication devices, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

RF system 540 comprises transceiver, modulation, filtering, multiplexer/de-multiplexer, signal processing, and amplifier circuitry for communicating with user devices using wireless communication protocols. In this example, RF system 540 includes at least one filter 541, modulator 542, and amplifier 532 for each antenna port 544. Further filters, modulators, and amplifiers can be included for each antenna port. FIG. 5 shows eight antenna ports and associated circuitry, labeled A-H for each element, although a different number of elements can be included. RF system 540 transfers RF communications over at least ports 544A-544H for wireless transmission by antenna elements.

RF system 540 also receives command and control information and instructions from processing system 520 or baseband unit interface 510 for controlling the operations of filters 541, modulators 542, amplifiers 543, as well as wireless communications over the associated antenna ports 544. In typical examples, modulators 542 receive a modulation frequency indicator as an input to indicate a frequency to modulate user communications for transmission, and amplifiers 543 receive power level indicators as an input that indicates a power level to drive the associated user communications. These indicators can be received from baseband unit interface 510 or processing system 520.

Antenna ports 544A-544H include a plurality of configurable RF antenna ports that transmit and receive RF energy and signals to/from RF system 540 for transfer to antenna elements over one of RF links 552. Antenna elements can include a plurality of antenna elements and support structures for wirelessly transmitting wireless communications to user devices over wireless links, as discussed herein. For example, each antenna port can drive a corresponding orthogonal antenna element. In the examples discussed herein employing pairs of overlaid orthogonal antenna elements, pairs of antenna ports are used to drive a particular pair of overlaid orthogonal antenna elements. For example, port 544A and port 544B can drive a first pair of overlaid orthogonal antenna elements, port 544C and port 544D can drive a second pair of overlaid orthogonal antenna elements, port 544E and port 544F can drive a third pair of overlaid orthogonal antenna elements, and port 544G and port 544H can drive a fourth pair of overlaid orthogonal antenna elements.

RF links 552 provide modulated and amplified RF signals to antenna elements. RF links 522 can each use various protocols or communication formats, such as described herein for link 141, including combinations, variations, or improvements thereof. It should be understood that wireless signals could also be received by antenna elements for transfer over links 522 and antenna ports 544 to elements of RF system 540.

Link 551 comprises physical, logical, or virtual communication links, capable of communicating data, control signals, and communications, along with other information. In some examples, link 551 is encapsulated within the elements of baseband unit interface 510, processing system 520, or RF system 540, and may be software or logical links. In other examples, link 551 uses various communication media, such as air, space, metal, optical fiber, or some other signal propagation path, including combinations thereof. Link 551 could be direct links or might include various equipment, intermediate components, systems, and networks. Link 551 could be a common link, shared link, or may be comprised of discrete, separate links.

Referring back to FIG. 1, wireless communication device (WCD) 110 comprises transceiver circuitry and communication elements. The transceiver circuitry typically includes amplifiers, filters, modulators, and signal processing circuitry. WCD 110 may also include user interface systems, memory devices, non-transitory computer-readable storage mediums, software, processing circuitry, or some other communication components. WCD 110 may be a user device, wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Although one user device is shown in FIG. 1, it should be understood that a different number of devices could be included. WCD 110 could include multiple transceiver portions or antenna portions, among other circuit and equipment elements, for communicating wirelessly with multiple wireless communication networks, using different wireless communication modes or wireless communication protocols.

Communication network 130 comprises communication and control systems for providing access to communication services for other devices and networks. Communication network 130 can provide communication services including communication routing, link bridging, network communications, data exchange, or other communication services. In some examples, communication network 130 is a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Baseband unit 121 includes processing systems, transceivers, routers, computer-readable storage systems, among other equipment. Baseband unit 121 receives user communications from external systems, such as other systems of communication network 130 and transfers these user communications over link 142. In some examples, baseband unit 142 determines control instructions, such as antenna port configurations, for remote radio unit 122, and transfers these control instructions over link 142.

Remote radio unit 122 includes processing systems, amplifiers, transceivers, filters, routers, computer-readable storage systems, among other equipment for transmission of radio frequency (RF) signals and/or wireless signals. Remote radio unit 122 receives user communications from baseband unit 121 over link 142, and transfers the user communications as RF signals over selected ones of antenna ports 141. Remote radio unit 122 could process and modify the user communications, such as including the communications within wireless communication protocol structures, data structures, or for apportioning among communication channels, frequencies, timeslots, or other configurations. Remote radio unit 122 can also receive control instructions from baseband unit 121 over link 142, and in response to the control instructions, modifies antenna port configurations. As shown in FIG. 1, remote radio unit 122 includes one or more antenna ports 141 which are each associated with antenna element portions of antenna system 123. Antenna ports 141 can transfer RF signals to associated antenna elements, where antenna system 123 transfers the RF signals as wireless signals for receipt by at least WCD 110. Although transmission of signals is discussed, it should be understood that elements described in FIG. 1 could also receive wireless communications from wireless communication devices.

Antenna system 123 includes a plurality of antenna elements and support structures for wirelessly transmitting wireless communications to user devices over at least wireless link 140. Antenna system 123 receives RF energy over antenna ports 141 and transfers the RF energy wirelessly over wireless link 140. In this example, antenna system 123 includes one or more pairs of overlaid orthogonal antenna elements.

Communication links 141-143 each use metal, glass, optical, air, space, or some other material as the transport media. Communication links 142-143 could each use various communication protocols, such as optical signaling, Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 142-143 could each be a direct link or may include intermediate networks, systems, or devices, and could include a logical network link transported over multiple physical links.

Wireless link 140 uses the air or space as the transport media. Wireless link 140 can comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof. Although one wireless link 140 is shown in FIG. 1, it should be understood that wireless link 140 is merely illustrative to show communication modes or wireless access pathways for wireless communication device 140. In other examples, further wireless links could be shown, with portions of the further wireless links shared and used for different communication sessions and associated overhead communications.

Communication links 140-143 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a remote radio unit that drives an antenna system comprising pairs of overlaid orthogonal antenna elements, the method comprising:
   receiving user communications and control data transferred by a baseband unit;
   if the control data indicates a beamforming mode, then generating a first plurality of radio frequency (RF) signals directed to at least one of the pairs of overlaid orthogonal antenna elements for target wireless communication devices;
   if the control data indicates a multiple input multiple output (MIMO) mode, then generating a second plurality of RF signals for the plurality of antenna elements, wherein the second plurality of RF signals are directed to non-adjacent ones of the pairs of the overlaid orthogonal antenna elements for the target wireless communication devices.

2. The method of claim 1, wherein if the control data indicates the beamforming mode, then the control data further indicates at least one of the pairs of the overlaid orthogonal antenna elements that are to have the user communications directed thereto, a first modulation frequency to generate the first plurality of RF signals using the user communications, and first power levels of the first plurality of RF signals; and
   wherein if the control data indicates the MIMO mode, then the control data further indicates which ones of the pairs of the overlaid orthogonal antenna elements that are to have the user communications directed thereto, a second modulation frequency to generate the second plurality of RF signals using the user communications, and second power levels of the second plurality of RF signals.

3. The method of claim 1, further comprising:
   apportioning the user communications across the plurality of antenna elements based on the control data.

4. The method of claim 1, wherein generating the first plurality of RF signals directed to at least one of the pairs of overlaid orthogonal antenna elements comprises generating the first plurality of RF signals directed to two adjacent pairs of overlaid orthogonal antenna elements.

5. The method of claim 4, wherein the two adjacent pairs of overlaid orthogonal antenna elements are spaced at most 0.5 wavelength of a carrier frequency of the first plurality of RF signals.

6. The method of claim 1, wherein the non-adjacent ones of the pairs of the overlaid orthogonal antenna elements are spaced at least 0.65 wavelength of a carrier frequency of the second plurality of RF signals.

7. The method of claim 1, wherein the antenna system comprises four pairs of the overlaid orthogonal antenna elements, wherein generating the first plurality of RF signals directed to at least one of the pairs of overlaid orthogonal antenna elements comprises generating the first plurality of RF signals directed to two adjacent pairs of overlaid orthogonal antenna elements, and wherein the second plurality of RF signals are directed to either a first and a third pair of the four pairs of the overlaid orthogonal antenna elements or a second and a fourth pair of the four pairs of the overlaid orthogonal antenna elements.

8. The method of claim 7, wherein the two adjacent pairs of overlaid orthogonal antenna elements are spaced at most 0.5 wavelength of a carrier frequency of the first plurality of RF signals, and wherein the non-adjacent ones of the pairs of the overlaid orthogonal antenna elements are spaced at least 0.65 wavelength of a carrier frequency of the second plurality of RF signals.

9. The method of claim 1, wherein the first plurality of RF signals are directed to the at least one of the pairs of overlaid orthogonal antenna elements to establish a first RF beam that carries at least a first portion of the user communications and targets at least a first one of the target wireless communication devices; and further comprising:
   generating a third plurality of RF signals for concurrent transmission with the first plurality of RF signals, the third plurality of RF signals directed to at least another one of the pairs of overlaid orthogonal antenna elements to establish a second RF beam that carries at least a second portion of the user communications and targets at least a second one of the target wireless communication devices.

10. The method of claim 1, wherein the second plurality of RF signals are directed to a first two non-adjacent ones of the pairs of the overlaid orthogonal antenna elements to establish a first MIMO transmission that carries at least a first portion of the user communications for at least a first one of the target wireless communication devices, and further comprising:
    generating a third plurality of RF signals for concurrent transmission with the second plurality of RF signals, the third plurality of RF signals directed to a second two non-adjacent ones of the pairs of the overlaid orthogonal antenna elements to establish a second MIMO transmission that carries at least a second portion of the user communications for at least a second one of the target wireless communication devices.

11. A remote radio unit that drives an antenna system comprising pairs of overlaid orthogonal antenna elements, the remote radio unit comprising:
    a baseband unit interface configured to receive user communications and control data transferred by a baseband unit; and
    a radio frequency (RF) system configured to generate RF signals directed to the antenna system based on at least the user communications and the control data;
    if the control data indicates a beamforming mode, then the RF system is configured to generate a first plurality of RF signals directed to at least one of the pairs of overlaid orthogonal antenna elements for target wireless communication devices;
    if the control data indicates a multiple input multiple output (MIMO) mode, then the RF system is configured to generate a second plurality of RF signals for the plurality of antenna elements, wherein the second plurality of RF signals are directed to non-adjacent ones of the pairs of the overlaid orthogonal antenna elements for the target wireless communication devices.

12. The remote radio unit of claim 11, wherein if the control data indicates the beamforming mode, then the control data further indicates at least one of the pairs of the overlaid orthogonal antenna elements that are to have the user communications directed thereto, a first modulation frequency to generate the first plurality of RF signals using the user communications, and first power levels of the first plurality of RF signals; and wherein if the control data indicates the MIMO mode, then the control data further indicates which ones of the pairs of the overlaid orthogonal antenna elements that are to have the user communications directed thereto, a second modulation frequency to generate the second plurality of RF signals using the user communications, and second power levels of the second plurality of RF signals.

13. The remote radio unit of claim 11, further comprising:
the baseband unit interface configured to apportion the user communications across the plurality of antenna elements based on the control data.

14. The remote radio unit of claim 11, comprising:
the RF system configured to generate the first plurality of RF signals directed to two adjacent pairs of overlaid orthogonal antenna elements.

15. The remote radio unit of claim 14, wherein the two adjacent pairs of overlaid orthogonal antenna elements are spaced at most 0.5 wavelength of a carrier frequency of the first plurality of RF signals.

16. The remote radio unit of claim 11, wherein the non-adjacent ones of the pairs of the overlaid orthogonal antenna elements are spaced at least 0.65 wavelength of a carrier frequency of the second plurality of RF signals.

17. The remote radio unit of claim 11, wherein the antenna system comprises four pairs of the overlaid orthogonal antenna elements, and comprising:
the RF system configured to generate the first plurality of RF signals directed to two adjacent pairs of overlaid orthogonal antenna elements; and
the RF system configured to generate the second plurality of RF signals directed to either a first and a third pair of the four pairs of the overlaid orthogonal antenna elements or a second and a fourth pair of the four pairs of the overlaid orthogonal antenna elements.

18. The remote radio unit of claim 17, wherein the two adjacent pairs of overlaid orthogonal antenna elements are spaced at most 0.5 wavelength of a carrier frequency of the first plurality of RF signals, and wherein the non-adjacent ones of the pairs of the overlaid orthogonal antenna elements are spaced at least 0.65 wavelength of a carrier frequency of the second plurality of RF signals.

19. The remote radio unit of claim 11, wherein the first plurality of RF signals are directed to the at least one of the pairs of overlaid orthogonal antenna elements to establish a first RF beam that carries at least a first portion of the user communications and targets at least a first one of the target wireless communication devices; and comprising:
the RF system configured to generate a third plurality of RF signals for concurrent transmission with the first plurality of RF signals, the third plurality of RF signals directed to at least another one of the pairs of overlaid orthogonal antenna elements to establish a second RF beam that carries at least a second portion of the user communications and targets at least a second one of the target wireless communication devices.

20. The remote radio unit of claim 11, wherein the second plurality of RF signals are directed to a first two non-adjacent ones of the pairs of the overlaid orthogonal antenna elements to establish a first MIMO transmission that carries at least a first portion of the user communications for at least a first one of the target wireless communication devices, and comprising:
the RF system configured to generate a third plurality of RF signals for concurrent transmission with the second plurality of RF signals, the third plurality of RF signals directed to a second two non-adjacent ones of the pairs of the overlaid orthogonal antenna elements to establish a second MIMO transmission that carries at least a second portion of the user communications for at least a second one of the target wireless communication devices.

* * * * *